United States Patent
Fleischer et al.

(10) Patent No.: US 12,303,825 B2
(45) Date of Patent: May 20, 2025

(54) CARBON CAPTURE SYSTEM COMPRISING A GAS TURBINE WITH TWO BURNERS

(71) Applicant: KARBON CCS LTD., Valletta, MT (US)

(72) Inventors: Henrik Fleischer, Slependen (NO); Knut Erik Børseth, Sandefjord (NO)

(73) Assignee: KARBON CCS GLOBAL LTD, Limassol (CY)

( * ) Notice: Subject to any disclaimer, the term of this patent is extended or adjusted under 35 U.S.C. 154(b) by 382 days.

(21) Appl. No.: 17/861,845

(22) Filed: Jul. 11, 2022

(65) Prior Publication Data
US 2024/0009616 A1 Jan. 11, 2024

(51) Int. Cl.
B01D 53/92 (2006.01)
B01D 53/14 (2006.01)
F23J 15/02 (2006.01)

(52) U.S. Cl.
CPC ......... *B01D 53/1475* (2013.01); *B01D 53/92* (2013.01); *F23J 15/02* (2013.01); *B01D 53/1431* (2013.01); *B01D 2251/606* (2013.01); *B01D 2257/504* (2013.01); *B01D 2258/0283* (2013.01); *F23J 2215/50* (2013.01)

(58) Field of Classification Search
CPC .......... B01D 53/14; B01D 53/92; F23J 15/02
See application file for complete search history.

(56) References Cited

U.S. PATENT DOCUMENTS

| | | |
|---|---|---|
| 2008/0104958 A1 | 5/2008 | Finkenrath et al. |
| 2008/0127632 A1* | 6/2008 | Finkenrath ............. B01D 53/62 60/274 |
| 2021/0060478 A1 | 3/2021 | Børseth et al. |

FOREIGN PATENT DOCUMENTS

| | | |
|---|---|---|
| WO | WO 2005/045316 A2 | 5/2005 |
| WO | WO2019/172772 A1 | 9/2019 |
| WO | WO2021/210989 A1 | 10/2021 |

OTHER PUBLICATIONS

Internationl Search Report dated Nov. 2, 2023 for Application No. PCT/NO2023/060016.
Rochelle et al. "CO2 Capture by Absorption with Potassium Carbonate Fourth Quarterly Report 2005", Quarterly Progress Report, Department of Chemical Engineering, University of Texas at Austin, Jan. 26, 2005, p. 1-74.
Seier et al., "COORETEC Lighthouse Concept, The path to fossil-fired power plants for the future", Research Report No. 566, Federal Ministry of Economics and Technology, Apr. 2008, pp. 1-72 (76 pages total).
Written Opinion of the International Searching Authority dated Nov. 2, 2023 for Application No. PCT/NO2023/060016.

* cited by examiner

*Primary Examiner* — Sharon Pregler
(74) *Attorney, Agent, or Firm* — Birch, Stewart, Kolasch & Birch, LLP

(57) ABSTRACT

A carbon capture system includes a CO2-containing flue gas from any CO2 producing source connected to a first flue gas compressor of a gas turbine with a corresponding first turbine expander and a generator driven by said gas turbine. The gas turbine includes a first burner and a second burner, wherein the second burner utilizes at least a non-carbon fuel such as Hydrogen (H2) or Ammonia (NH3), so as for increasing a temperature of a first relatively hot compressed CO2-lean flue gas to a second relatively hotter compressed CO2-lean flue gas for being fed into said first expander.

13 Claims, 7 Drawing Sheets

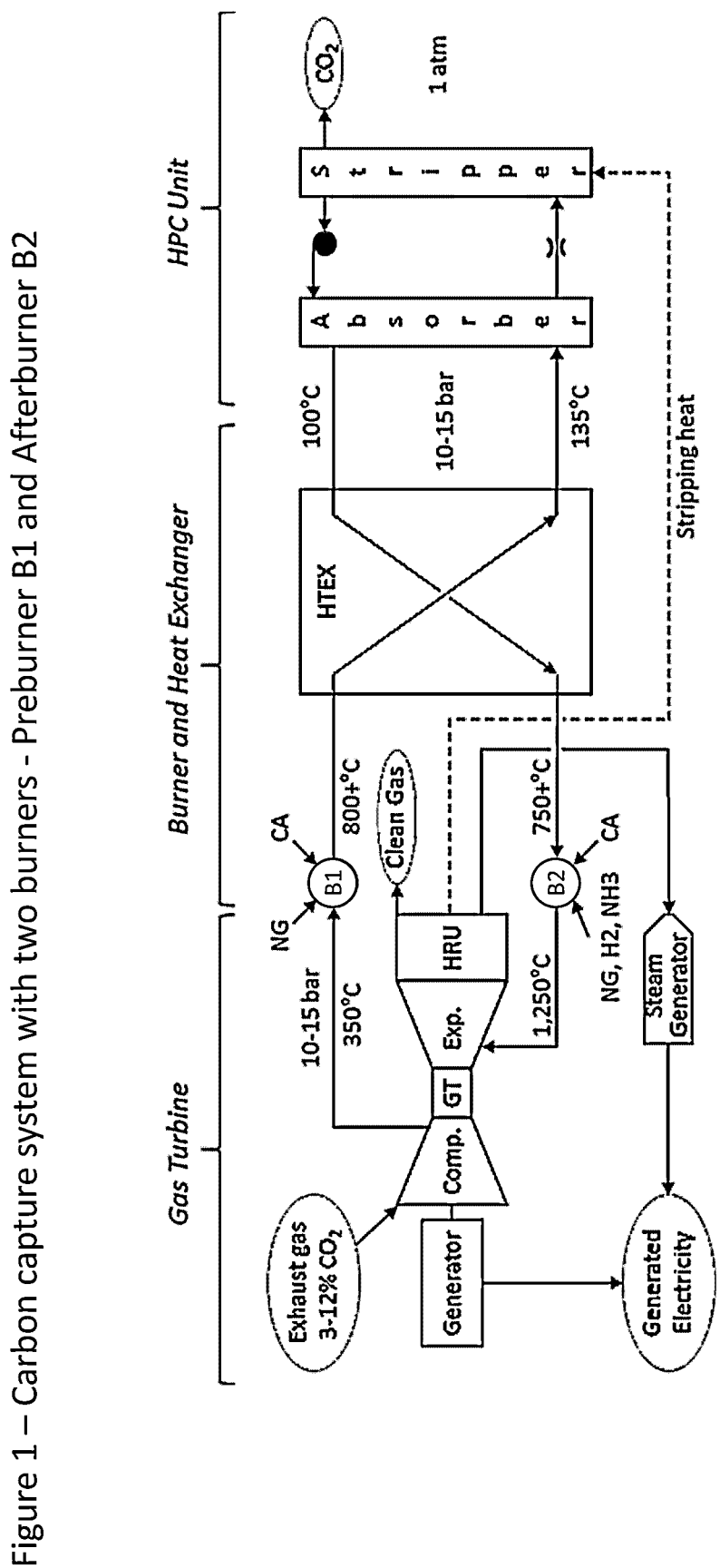
Figure 1 – Carbon capture system with two burners - Preburner B1 and Afterburner B2

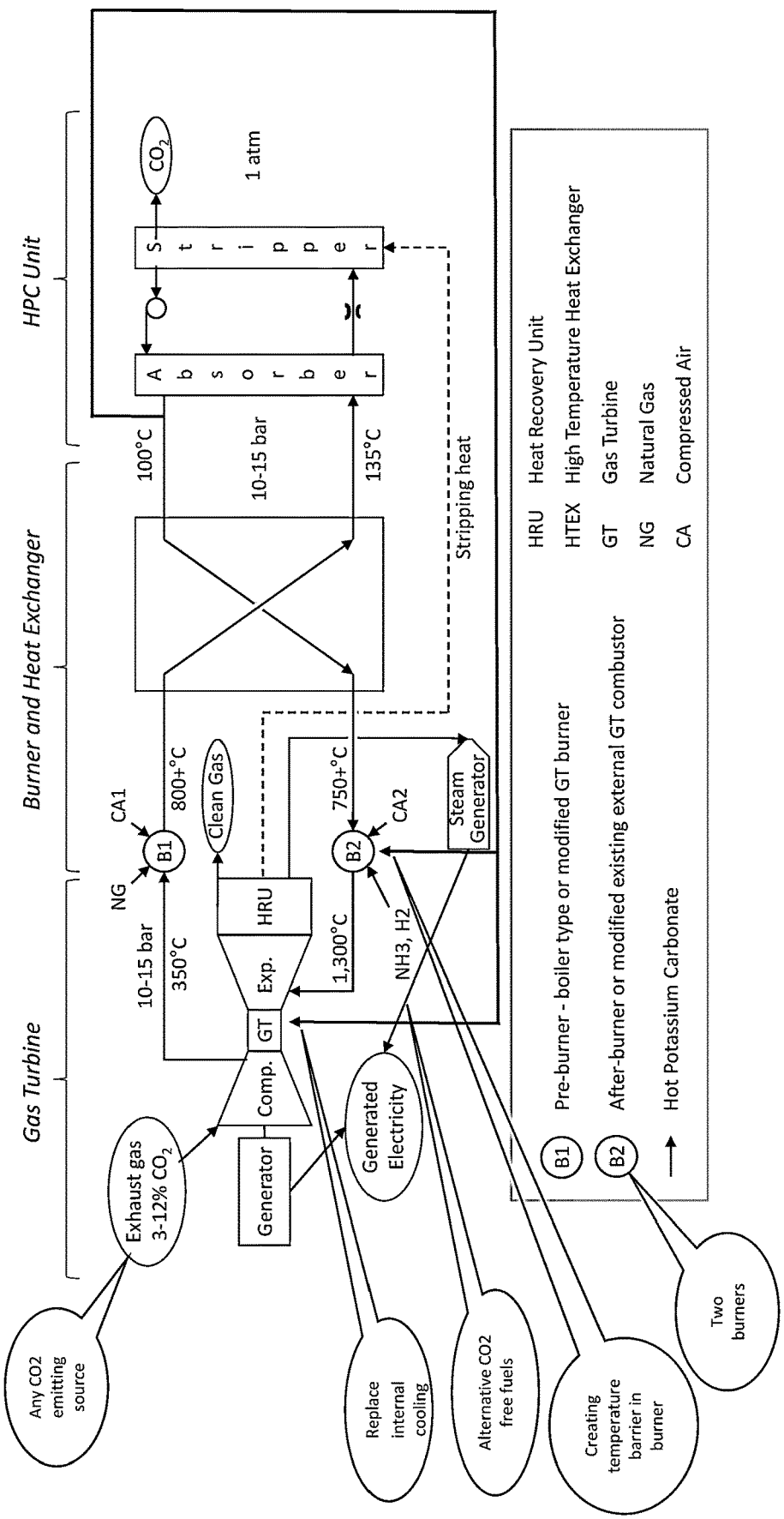
Figure 2 – Carbon capture system with two burners – Cooling line after the absorber unit

Figure 3a) Principle flow diagram

Figure 3b) Principle schematic illustration

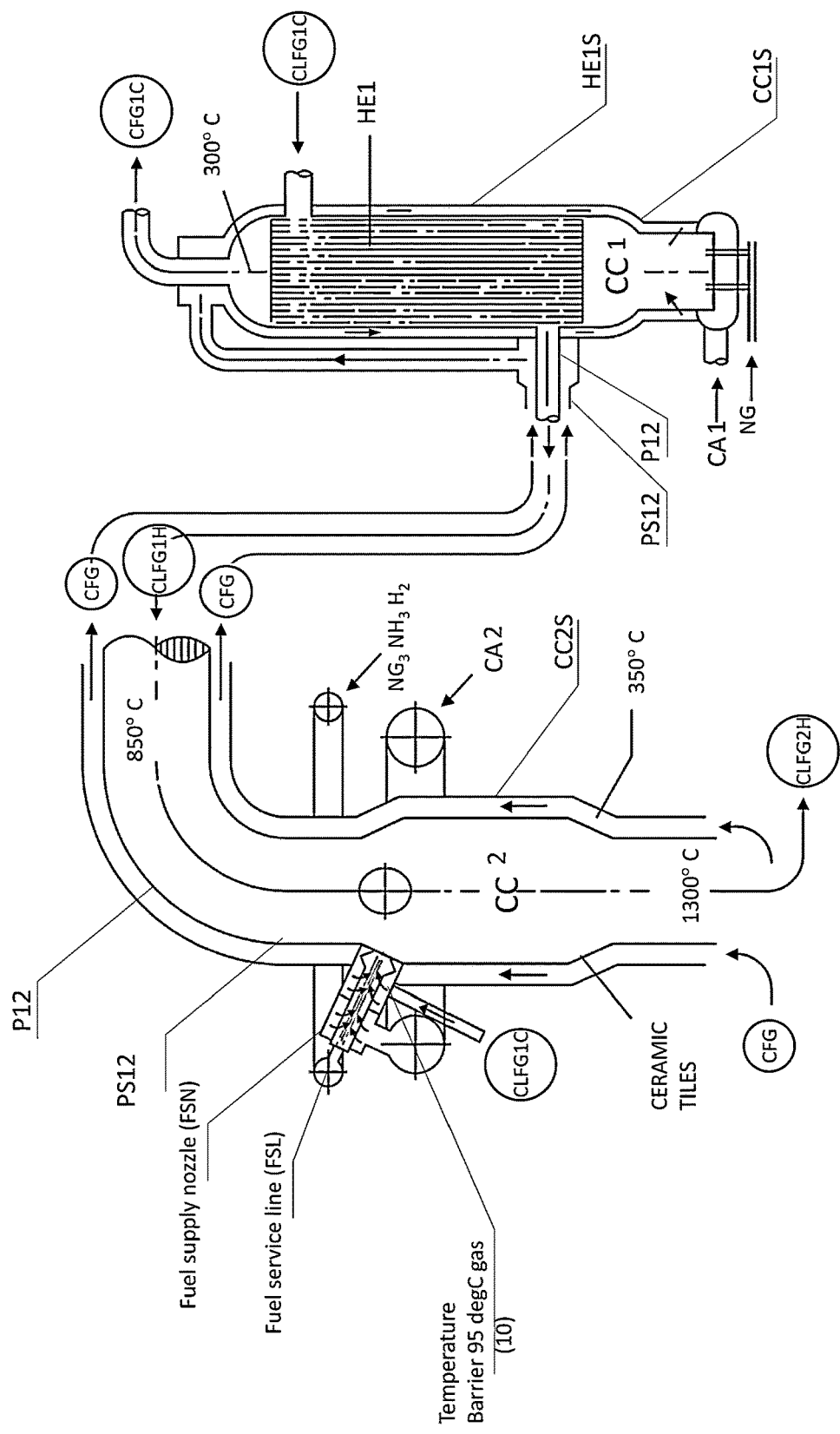
Figure 4 – Inline afterburner B2

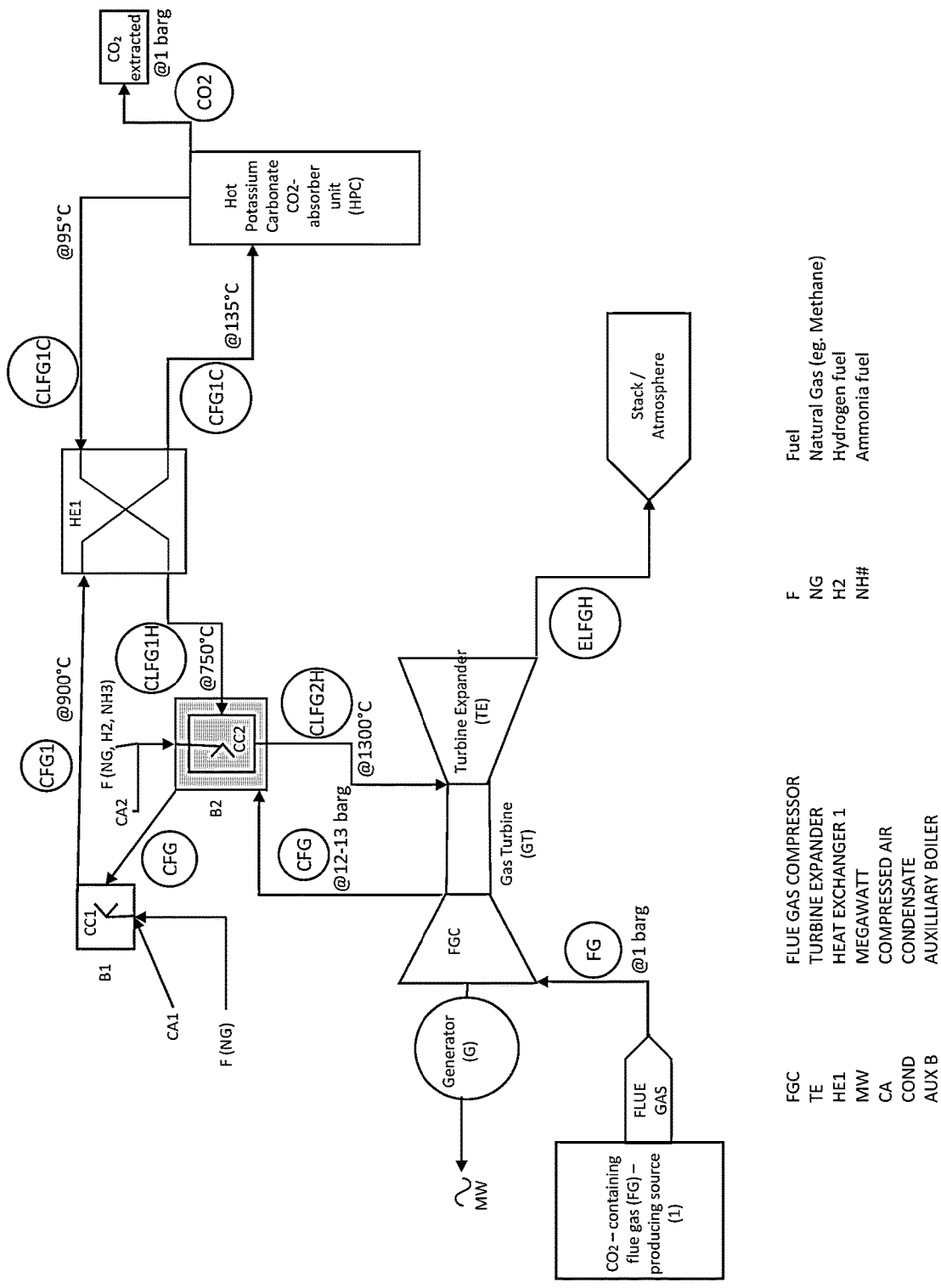
Figure 5 – General overview of a carbon capture system with two burners

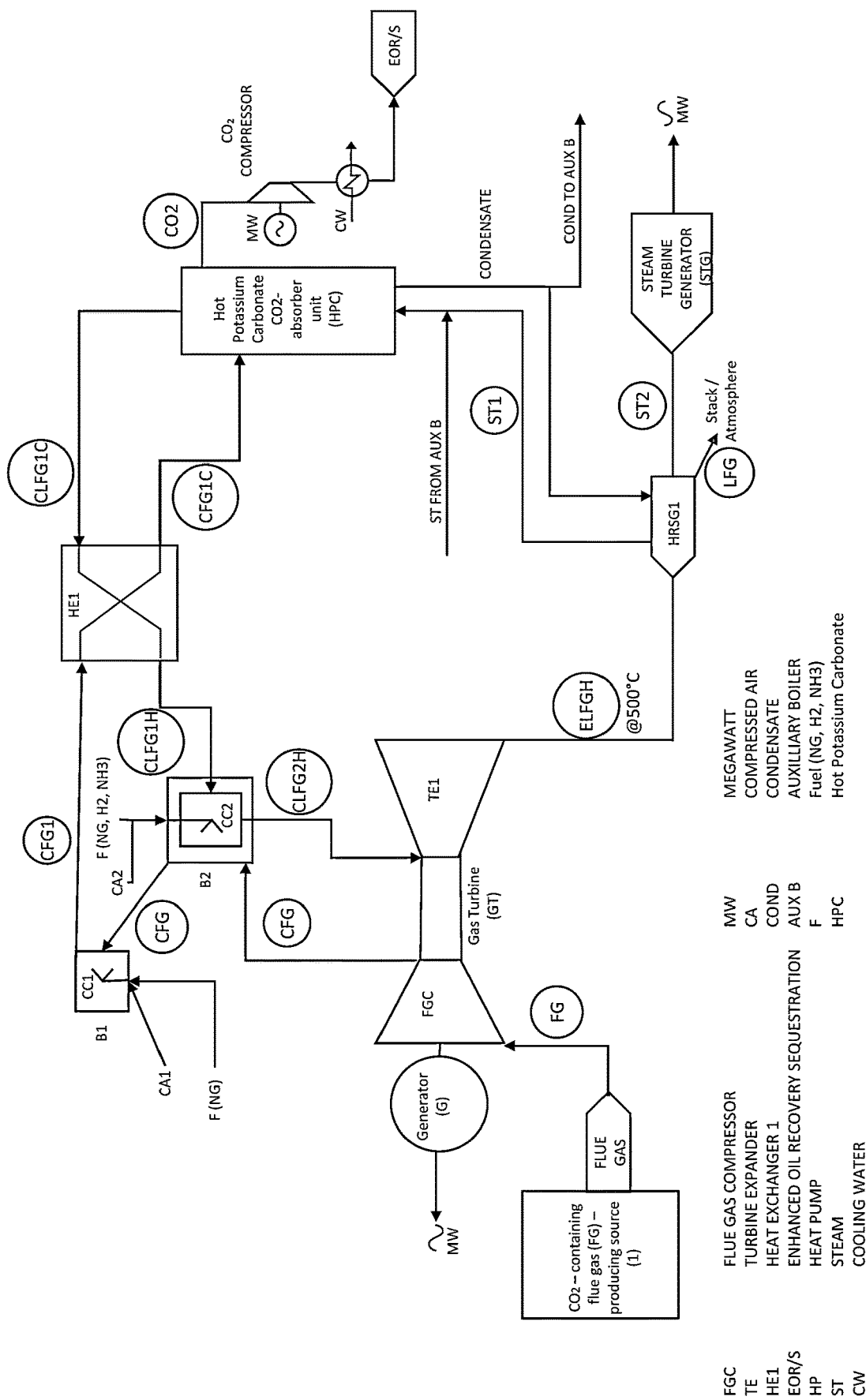
Figure 6 – Extended overview of a carbon capture system with two burners

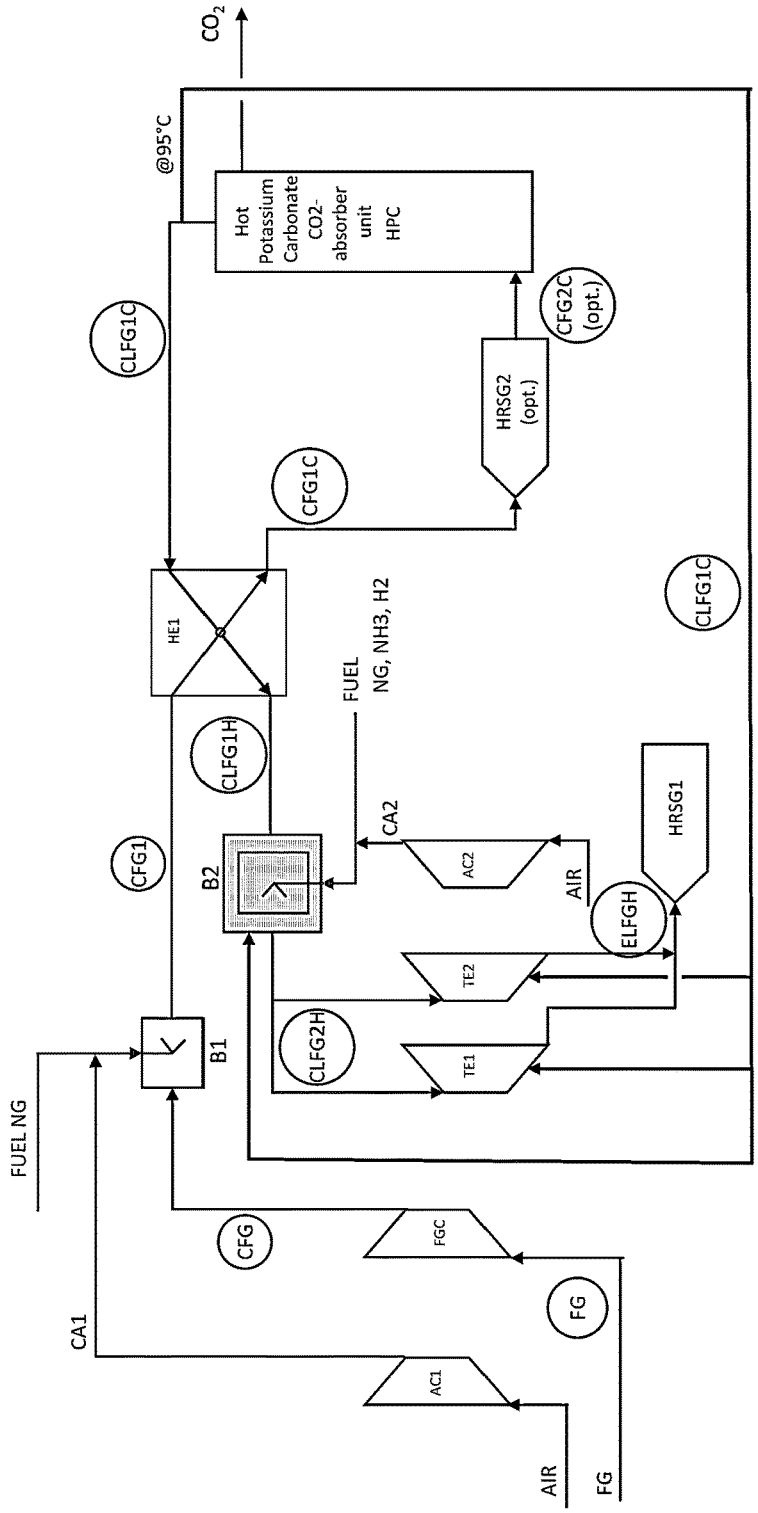
Figure 7 – Extended overview of a carbon capture system comprising two turbine expanders with external cooling line

CARBON CAPTURE SYSTEM COMPRISING A GAS TURBINE WITH TWO BURNERS

FIELD OF THE INVENTION

The present invention relates to the field of carbon capture technology with CO2 extraction in a so-called Hot Potassium Carbonate (HPC) unit for a CO2 producing flue gas source directed to a flue gas compressor part of a gas turbine such that a partial flue gas pressure of the carbon capture process is increased.

More specifically, it is a CO2 capture process with a gas turbine comprising two burners with combustion chambers. A first burner, preburner, designed for further burning the CO2 rich compressed flue gas with low oxygen from the flue gas compressor before further supplying a heat exchanger on the route to a HPC unit, and a second burner, afterburner, design for heating up returning CO2-lean flue gas from said heat exchanger, after the HPC unit, before a turbine expander.

BACKGROUND OF THE INVENTION

The applicant has worked with carbon capture system utilizing hot potassium carbonate in the process for decades and they have published two patent applications WO2019172772 and WO2021210989 which uses design with gas turbine comprising a flue gas compressor, one burner with combustion chamber and a turbine expander, and wherein a flue gas is led to a burner after said flue gas compressor and then to a heat exchanger on the path to said HPC unit.

A known challenge with today's hot potassium carbonate CO2 extraction plant is to increase the partial pressure of the CO2 rich gas. This can be solved by utilizations of a gas turbine compressor, but other challenges occurs, as to maintain a sustainable efficiency rate of that gas turbine, especially due to heat loss, and to keep a mass balance for gas turbine.

The present invention is generally concerned with solving at least one, but preferably several, of the challenges which exist with the prior art. More particularly, it has been an object of the invention to develop.

BRIEF SUMMARY OF THE INVENTION

The invention is defined by the independent claim 1 which is a carbon capture system comprising
  a CO2-containing flue gas producing source connected to
  a first flue gas compressor of a gas turbine with a corresponding first turbine expander and a generator driven by said gas turbine,
  said gas turbine comprising
    a first burner with a first combustion chamber arranged for burning a compressed flue gas and
    a second burner with a second combustion chamber arranged for afterburning a relatively hot compressed CO2-lean flue gas, wherein
  said second burner receiving compressed flue gas from said compressor, said compressed flue gas for cooling a second combustion chamber shell of said second combustion chamber,
  said second combustion chamber shell further connected via a coaxial pipe with a coaxial piping shell for further transporting said compressed flue gas flow to
  a first combustion chamber shell of a first burner for cooling said first combustion chamber and being fed into said first combustion chamber for combustion with compressed air and fuel to produce a first compressed preburned flue gas,
  said first compressed preburned flue gas being fed to a first heat exchanger for cooling, transferring heat to a downstream produced relatively cold compressed CO2-lean flue gas, forming a first compressed preburned cooled flue gas,
  said first compressed preburned cooled flue gas sent to a hot potassium process C02 absorber plant for returning said relatively cold compressed CO2-lean flue gas back to said first heat exchanger for being heated to a first relatively hot compressed CO2-lean flue gas for feeding to said second burner,
  said first relatively hot compressed CO2-lean flue gas being mixed and afterburned by said second burner with a compressed air flow and at least a non-carbon fuel such as Hydrogen or Ammonia, so as for increasing a temperature of said first relatively hot compressed CO2-lean flue gas to a second relatively hotter compressed CO2-lean flue gas for being fed into said first expander.

Further, inventive embodiments of the invention are set out in the dependent claims.

FIGURE CAPTIONS

Embodiments of the present invention will now be described, by way of example only, with reference to the following figures, wherein:

FIG. 1 shows the schematic of three main parts of the invention a Gas Turbine, Two Burners and a Heat Exchanger and a HPC Unit.

FIG. 2 shows the schematic of the three main parts, as mentioned for

FIG. 1, but now also including a branch line from the returning gas line from the HPC Unit to a gas turbine for cooling and to an afterburner (B2) for temperature barrier.

Figure 3A:
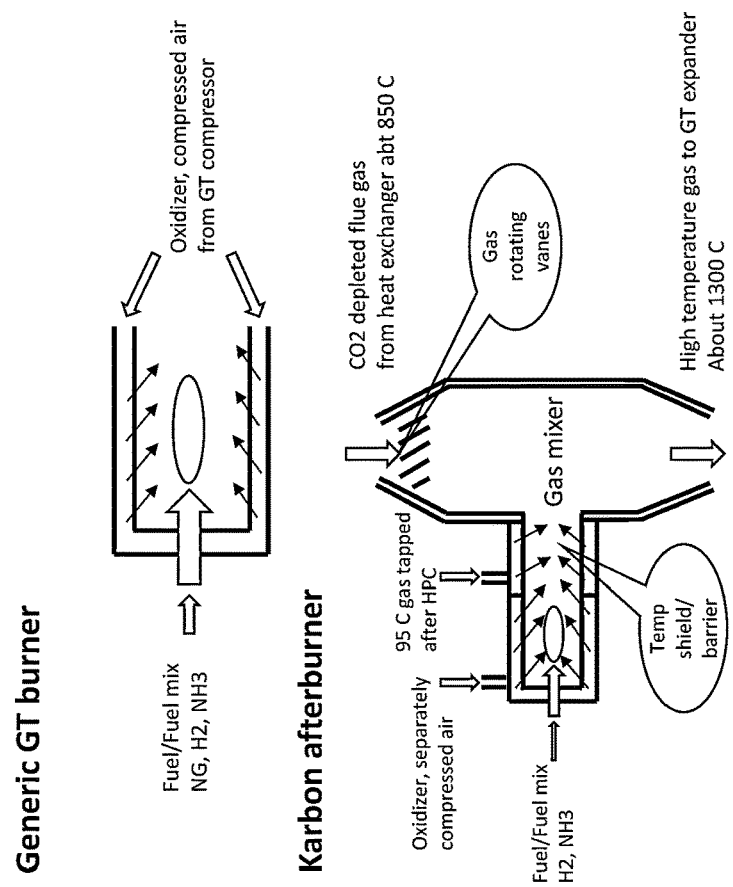

FIG. 3a shows a principle flow diagram of a generic gas turbine (GT) burner versus Karbon afterburner (B2).

Figure 3B:
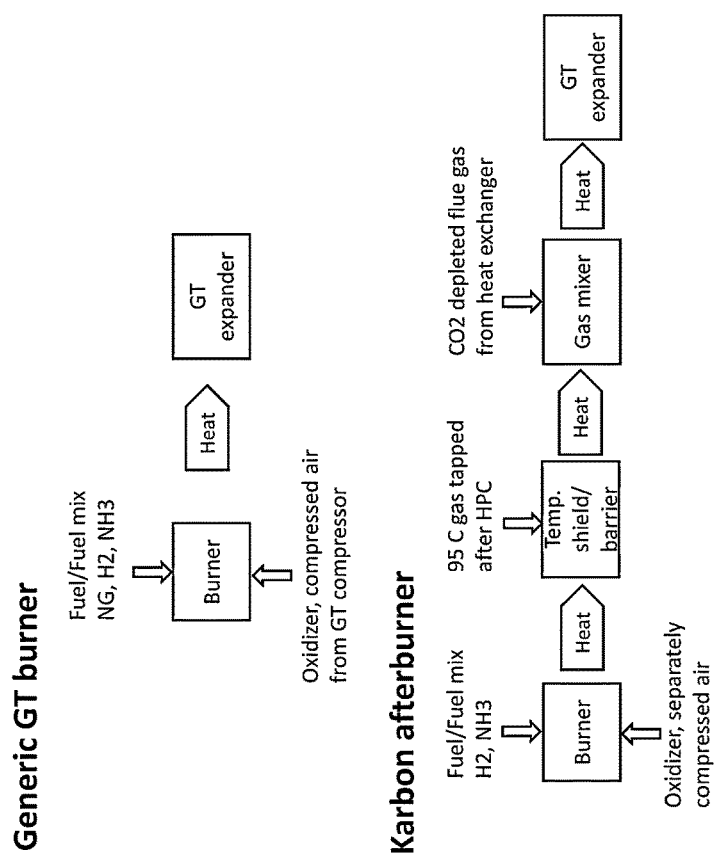

FIG. 3b shows a principle schematic illustration of a generic gas turbine (GT) burner versus a Karbon afterburner (B2).

FIG. 4 shows an illustration of Karbon's afterburner (second burner—B2) and preburner (first burner—B1) and the connection between said two burners.

FIG. 5 shows the schematic general overview of a carbon capture system with a first burner (B1) and a second burner (B2).

FIG. 6 shows the schematic extended overview of a carbon capture system with a first burner (B1) and a second burner (B2).

FIG. 7 shows the schematic overview of a carbon capture system with two burners (B1, B2), two turbine expanders (TE1, TE2) and a branch pipe for external cooling of said turbine expanders (TE1, TE2) and for temperature barrier at said second burner (B2).

Embodiments of the present invention will now be described, by way of example only, with reference to the above mentioned Figures.

EMBODIMENTS OF THE INVENTION

The present invention provides a carbon capture system comprising a CO2-containing flue gas (FG)-producing source (1) connected to a first flue gas compressor (FGC) of a gas turbine (GT) with a corresponding first turbine expander (TE1) and a generator (G) driven by said gas turbine (GT), said gas turbine (GT) comprising
a first burner (B1) with a first combustion chamber (CC1) arranged for burning a compressed flue gas (CFG) and
a second burner (B2) with a second combustion chamber (CC2) arranged for afterburning a relatively hot compressed CO2-lean flue gas (CLFG1H), wherein
said second burner (B2) receiving compressed flue gas (CFG) from said flue gas compressor (FGC), said compressed flue gas (CFG) for cooling a second combustion chamber shell (CC2S) of said second combustion chamber (CC2),
said second combustion chamber shell (CC2S) further connected via a coaxial pipe (P12) with a coaxial piping shell (PS12) for further transporting said compressed flue gas flow (CFG) to
a first combustion chamber shell (CC1S) of a first burner (B1) for cooling said first combustion chamber (CC1) and being fed into said first combustion chamber (CC1) for combustion with compressed air (CA1) and fuel (G) to produce a first compressed preburned flue gas (CFG1),
said first compressed preburned flue gas (CFG1) being fed to a first heat exchanger (HE1) for cooling, transferring heat to a downstream produced relatively cold compressed CO2-lean flue gas (CLFG1C), forming a first compressed preburned cooled flue gas (CFG1C),
said first compressed preburned cooled flue gas (CFG1C) sent to a hot potassium process C02 absorber plant (HPC) for returning said relatively cold compressed CO2-lean flue gas (CLFG1C) back to said first heat exchanger (HE1) for being heated to a first relatively hot compressed CO2-lean flue gas (CLFG1H) for feeding to said second burner (B2),
said first relatively hot compressed CO2-lean flue gas (CLFG1H) being mixed and afterburned by said second burner (B2) with a compressed air flow (CA2) and at least a non-carbon fuel such as Hydrogen (H2) or Ammonia (NH3), so as for increasing a temperature of said first relatively hot compressed CO2-lean flue gas (CLFG1H) to a second relatively hotter compressed CO2-lean flue gas (CLFG2H) for being fed into said first expander (TE1). An advancement behind this arrangement is to increase the temperature for the inlet gas to said first expander (TE1) to increase the gas turbine (GT) efficiency rate. Simulation example shows that the efficiency rate for a gas turbine, type "SGT6-2000E", will be increased from about 25% to about 34%, with a second burner (B2), that lifts an inlet gas temperature from 750° C. to about 1150° C. before the turbine expander. Another advancement is that said first heat exchanger (HE1) inlet temperature can be controlled and regulated such that said heat exchanger (HE1) will not be exposed for temperatures above about 900° C.

FIG. 5 shows a schematic embodiment of the invention as described above, wherein a CO2-containing flue gas (FG) from any flue gas producing source (1) is led to gas turbine (GT) flue gas compressor (FGC) to be compressed from about 1 barg to about 12-13 barg, to a compressed flue gas (CFG). The compressed flue gas is then led to a second burner's (B2) second combustion chamber shell (CCS2) as cooling aid before returning also as compressed flue gas (CFG) to the first burner's (B1) first combustion chamber shell (CCS1) as cooling aid, before entering into the first burner's combustion chamber shell (CCS1) through apertures and participates in the combustion with fuel, such as natural gas e.g. methane, and forming a first compressed preburned flue gas (CFG1) with a temperature about 900° ° C. Said compressed flue gas (CFG) can as an option, also apply as a cooling aid for a first heat exchanger (HE1), wherein the compressed flue gas (CFG) is led to a heat exchanger shell after said second combustion chamber shell (CCS2) but before said first combustion chamber shell (CCS1) (not shown in the FIG. 5, but shown in FIG. 4). Said first compressed preburned flue gas (CFG1) is then led through a first heat exchanger (HE1), for cooling down to a first compressed preburned cooled flue gas (CFG1C) to about 135° C. further led to a hot potassium process C02 absorber plant (HPC) for extracting CO2 from said CO2-containing flue gas (FG), and for returning a relatively cold compressed CO2-lean flue gas (CLFG1C) with temperature about 95° C. back to said first heat exchanger (HE1) for heating said relatively cold compressed CO2-lean flue gas (CLFG1C) into a relatively hot compressed CO2-lean flue gas (CLFG1H) to about 750° C. for being fed into said second burner and mixed with at least a non-carbon fuel such as ammonia (NH3) or hydrogen (H2) for heating up said first relatively hot compressed CO2-lean flue gas (CLFG1H) into second relatively hotter compressed CO2-lean flue gas (CLFG2H) with temperature about 1300° C. for feeding a first turbine expander (TE1). To utilize non-carbon fuel or a mix of non-carbon fuel and low carbon fuel in the second burner gives non- or low CO2 emissions in combination with increased efficiency for said gas turbine first turbine expander (TE1). FIG. 5 further shows that after said first turbine expander (TE1) a first expanded relative hot CO2-lean flue gas is led to the stack or atmosphere.

In an embodiment of the invention, wherein said second combustion chamber (CC2) forms part of said coaxial pipe (P12) feeding the first expander (TE1), said coaxial pipe (P12) running from said first heat exchanger (HE1) to said second combustion chamber (CC2), said coaxial pipe (P12) having said piping shell (PS12). The reasoning behind this arrangement is to feed the compressed flue gas to cool the coaxial shell about the second combustion chamber, the coaxial pipe, the heat exchanger, and the first combustion chamber. This reduces the surface temperatures of the pressure shells of the combustion chambers and the piping.

FIG. 4 shows a schematic illustration of an embodiment of the invention, wherein said second burner (B2), afterburner, is designed as an inlet burner such as it is integrated in the coaxial pipe (P12) with a coaxial pipe shell (P12S). The Figure shows a fuel supply pipe for pure or mixtures of gases as NG, NH3 and/or H2 and a supply pipe for a second compressed air (CA2) both connected to a nozzle part for mixture and spraying said gases into a second combustion chamber (CC2) for burning and heating up said first relatively hot compressed CO2-lean flue gas (CLFG1H) from about 850° C. into a second relatively hotter compressed CO2-lean flue gas (CLFG2H) with temperature about 1300° C. The Figure illustrates that a compressed flue gas (CFG) is entering the second burner's (B2) second combustion chamber shell (CCS2), annulus, and continues in said coaxial pipe shell (P12S), annulus, towards said first heat exchanger (HE1).

In an embodiment of the invention, wherein said coaxial piping shell (PS12) connected to a heat exchanger shell (HE1S) of said first heat exchanger (HE1), said heat exchanger shell (HE1S) further connected to a first combustion chamber shell (CC1S) of said first combustion chamber (CC1), said first combustion chamber shell (CC1S) arranged for feeding said compressed flue gas (CFG) to said first combustion chamber (CC1). The reason for this arrangement is to heat up said compressed flue gas (CFG) before entering into said first combustion chamber (CC1) for burning out any residuals of unburned gases from said CO2-containing flue gas producing source and to heat up the compressed flue gas (CFG) into a first compressed preburned flue gas (CFG1) to about 900° C. before the first heat exchanger (HE1).

FIG. 4 shows further a schematic illustration of the first burner's (B1), preburner, first combustion chamber (CC1) with combustion chamber shell (CC1S) directly connected to said first heat exchanger (HE1), wherein said coaxial pipe (12) is connected to said second burner (B2) for receiving said first relatively hot compressed CO2-lean flue gas (CLFG1H), and said first heat exchanger is receiving said compressed flue gas (CFG) from said coaxial pipe shell (P12S), annulus, and leads said compressed flue gas (CFG) through a pipe and into a first heat exchanger shell (HE1S) and further down to said combustion chamber shell (CC1S) and then into apertures in first combustion chamber (CC1) for combustion with natural gas (NG) and a first compressed air (CA1).

In an embodiment of the invention, wherein said relatively cold compressed CO2-lean flue gas (CLFG1C) flow is partly divided and routed to said second burner (B2) as a temperature barrier (10). This arrangement provides an obstacle in a nozzle for backfiring into a fuel service line (FSL), especially important while utilizing hydrogen ($H_2$) and/or ammonia ($NH_3$) as fuel.

FIG. 4 also shows said relatively cold compressed CO2-lean flue gas (CLFG1C) about 95° C. is returning after said hot potassium process C02 absorber plant (HPC) for working as a temperature barrier or shield for said second burner (B2), such as the temperature in a fuel supply nozzle (FSN), such as hydrogen ($H_2$) and ammonia ($NH_3$), will not increase enough for self-ignition in said fuel service line (FSL).

In an embodiment of the invention, wherein relatively cold compressed CO2-lean flue gas (CLFG1C) flow is partly divided and routed to said first gas turbine expander (TE1) as cooling agent. Use the relatively cold compressed CO2-lean flue gas (CLFG1C) flow around 95° C. as a cooling agent supply for said gas turbine (GT) and replacing an internal cooling by utilization of carbon rich compressed flue gas (CFG) with said relatively cold compressed CO2-lean flue gas (CLFG1C) flow reduces CO2 emissions, as after cooling said first turbine expansion (TE1) said cooling agent is routed directly to the atmosphere.

FIG. 7 shows a schematic illustration of a branch pipe from said relatively cold compressed CO2-lean flue gas (CLFG1C) at about 95° C. which is led towards a first turbine expander (TE1) and a second turbine expander (TE2) as cooling agent. FIG. 7 also shows a third branch from said relatively cold compressed CO2-lean flue gas (CLFG1C) routed to said second burner as temperature barrier/shield.

In an embodiment of the invention, wherein said second relatively hotter compressed CO2-lean flue gas (CLFG2H) being fed into said first expander (TE1) for driving a shaft coupled to said generator (G) and for generating a first expanded relative hot CO2-lean flue gas (ELFGH) further connected to a first heat recovery and steam generator unit (HRSG1). This arrangement is for further utilize said first expanded relative hot CO2-lean flue gas (ELFGH) leaving said turbine expander (TE1) with about 500° C.

In a further embodiment of the invention, wherein said first heat recovery and steam generation unit (HRSG1) is for production of a first steam (ST1) further connected to heat exchange with a stripper unit included in said hot potassium process C02 absorber unit (HPC). Said stripping unit is shown on FIG. 1 and FIG. 2.

In another embodiment of the invention, wherein said first heat recovery and steam generation unit (HRSG1) is for production of a second steam (ST2) further connected to a steam generator (SG) for production of electrical power.

FIG. 6 shows a schematic illustration of said first expanded relative hot CO2-lean flue gas (ELFGH) leaving said turbine expander (TE1) with about 500° C. to said first heat recovery and steam generator unit (HRSG1) for further providing said hot potassium process C02 absorber plant (HPC) with a first steam (ST1) and a steam turbine generator (STG) with a second steam (ST2) for producing electricity.

In an embodiment of the invention, wherein said first turbine expander (TE1) is constructed to expand additional mass flow from said second burner (B2). If additional mass flow is added to the process after the flue gas compressor [FGC], an oversized expander can be the solution to keep the mass balance if needed.

In an embodiment of the invention, wherein said second relatively hotter compressed CO2-lean flue gas (CLFG2H) is being fed into said first expander (TE1) and a second turbine expander (TE2) in parallel with said first expander (TE1). This is another solution if additional mass flow is added to the process after the flue gas compressor [FGC], to keep the mass balance from compress flue gas, extracted CO2 and added fuel and air in first and second burner (B1, B2).

In an embodiment, wherein said second expander (TE2) is installed in parallel to the first expander (TE1) operating at the same inlet pressure and temperature. This is necessary to avoid excessive flow and pressure on said first expander (TE1) that will result in surge of the flue gas compressor.

In an embodiment, wherein a first expander (TE1) can be utilized to produce electricity and a second expander (TE2) can be utilized for steam production for the heat exchanger at the stripping unit included in the HPC unit.

In FIG. 7 it is shown a schematic diagram of an embodiment with two turbine expanders (TE1, TE2), receiving second relatively hotter compressed CO2-lean flue gas (CLFG2H) with same pressure and temperature. The Figure shown further that they are delivering to a first heat recovery and steam generation unit (HRSG1). A second heat recovery and steam generation unit (HRSG2), is shown as an option on the Figure, connected after the first heat exchanger (HE1) receiving a first compressed preburned cooled flue gas (CFG1C) and returning a second compressed preburned cooled flue gas (CFG2C) to said Hot Potassium Carbonate CO2-absorber unit (HPC).

In FIG. 7 two air compressors are shown, a first air compressor (AC1), for compressing a first compressed air (CA1) to said first burner (B1) and a second air compressor (AC2), for compressing a second compressed air (CA2) to said second burner (B2).

In an embodiment of the invention, wherein said relatively cold compressed CO2-lean flue gas (CLFG1C) flow is partly divided and routed to said first gas turbine expander (TE1) and said second turbine expander (TE2) as cooling agent. See specially FIG. 7.

In an embodiment of the invention, wherein said first compressed preburned cooled flue gas (CFG1C) is led to a second heat recovery unit and steam generator (HRSG2), and further cooling the said first compressed preburned cooled flue gas (CFG1C) to a second compressed preburned cooled flue gas (CFG2C) which is further led to said Hot Potassium Carbonate CO2-absorber unit (HPC). Such configuration will contribute to decrease the gas temperature of the relatively cold compressed CO2-lean flue gas (CLFG1C) even further down than 95° C. This is an advantage both for the utilization of said relatively cold compressed CO2-lean flue gas (CLFG1C) as a cooling agent for said turbine expanders (TE1, TE2) but also for said first heat exchanger (HE1). Another scenario, said relatively cold compressed CO2-lean flue gas (CLFG1C) has a temperature set point at 95° C. after said Hot Potassium Carbonate CO2-absorber unit (HPC), by utilization of said second heat recovery and steam generation unit (HRSG2) the heat transfer in said first heat exchanger (HE1) can be reduced, simplify the heat balance of the first heat exchanger (HE1). See FIG. 7.

In an embodiment of the invention, wherein said extracted CO2 by said Hot Potassium Carbonate CO2-absorber unit (HPC) is led to a CO2 compressor and then cooled down before utilized in an enhanced oil recovery sequestration (EOR/S). Reference to FIG. 6, which shows such schematic diagram for said extracted CO2.

In an embodiment of the invention, wherein said second burner (B2) only uses non-carbon fuel, such as hydrogen ($H_2$) or ammonia ($NH_3$), to eliminate any further $CO_2$ emissions.

FIG. 1 shows a schematic overview of an embodiment of the invention with two burners. The Figure also indicates temperatures differences after each unit and the initial partial pressure after a gas turbine compressor. FIG. 1 shows the three main elements: Gas Turbine, Burner and Heat Exchanger and HPC unit.

FIG. 2 shows a schematic overview of an embodiment of the invention with two burners and a cooling line after the absorber unit. The Figure further describes that the exhaust gas, CO2 containing flue gas, can vary from with CO2 containment form 3% to 12%, dependent on the CO2 emitting source.

FIGS. 3a and 3b shows a principle flow diagram and a schematic illustration of a generic gas turbine burner, wherein the oxidizer is internally taken from the gas turbine compressor into the burner and wherein the cooling agent is also taken internally from the gas turbine compressor.

FIGS. 3a and 3b shows also a principle flow diagram and a schematic illustration of an embodiment of the inventions afterburner, wherein the oxidizer is taken from separately compressed air. The Figure further shows that the temperature barrier/shield is tapped after the HPC unit and that the CO2-lean (depleted) flue gas from first heat exchanger (HE1) is provided to second combustion chamber (CCS2), here named gas mixer, as this embodiment is provided with gas rotating vanes.

| | Reference table (number, tag and description) | |
|---|---|---|
| 1 | 1 | Any $CO_2$ producing source |
| 2 | 10 | Temperature barrier |
| 3 | GT | Gas turbine |
| 4 | FGC | Flue gas compressor |
| 5 | TE1 | First turbine expander |
| 6 | TE2 | Second turbine expander |
| 7 | G | Generator |
| 8 | HPC | Hot potassium carbonate - $CO_2$ absorber unit |
| 9 | STG | Steam turbine generator |
| 10 | HRU | Heat recovery unit |
| 11 | HRSG | Heat recovery and steam generator |
| 12 | HRSG1 | First heat recovery unit and steam generator |
| 13 | HRSG2 | Second heat recovery unit and steam generator |
| 14 | EOR/S | Enhanced oil recovery sequestration |
| 15 | AC1 | First air compressor |
| 16 | AC2 | Second air compressor |
| 17 | B1 | First burner/preburner |
| 18 | B2 | Second burner/afterburner |
| 19 | CC1 | First combustion chamber |
| 20 | CC2 | Second combustion chamber |
| 21 | CC1S | First combustion chamber shell |
| 22 | CC2S | Second combustion chamber shell |
| 23 | P12 | Coaxial pipe |
| 24 | PS12 | Coaxial piping shell |
| 25 | HE1 | First heat exchanger |
| 26 | HE1S | First heat exchanger shell |
| 27 | CA1 | Compressed air from first air compressor |
| 28 | CA2 | Compressed air from second air compressor |
| 29 | ST1 | First steam |
| 30 | ST2 | Second steam |
| 31 | NG | Natural gas fuel |
| 32 | H2 | Hydrogen fuel |
| 33 | NH3 | Ammonia fuel |
| 34 | CO2 | Carbon dioxide |
| 35 | FG | Flue gas |
| 36 | CFG | Compressed flue gas |
| 37 | CFG1 | First compressed preburned flue gas |
| 38 | CFG1C | First compressed preburned cooled flue gas |
| 39 | CFG2C | Second compressed preburned cooled flue gas |
| 40 | CLFG1H | First relatively hot compressed CO2-lean flue gas |
| 41 | CLFG2H | Second relatively hotter compressed CO2-lean flue gas |
| 42 | ELFGH | First expanded relative hot CO2-lean flue gas |
| 43 | FSN | Fuel supply nozzle |
| 44 | FSL | Fuel supply line |

The invention claimed is:

1. A carbon capture system comprising
a $CO_2$ containing flue gas from any $CO_2$ producing source connected to
a first flue gas compressor of a gas turbine with a corresponding first turbine expander and a generator driven by said gas turbine,
said gas turbine comprising
a first burner with a first combustion chamber arranged for burning a compressed flue gas and
a second burner with a second combustion chamber arranged for afterburning a hot compressed $CO_2$ lean flue gas, wherein
said second burner receiving said compressed flue gas from said first flue gas compressor, said compressed flue gas for cooling a second combustion chamber shell of said second combustion chamber,
said second combustion chamber shell further connected via a coaxial pipe with a coaxial piping shell for further transporting said compressed flue gas flow to
a first combustion chamber shell of a first burner for cooling said first combustion chamber and being fed into said first combustion chamber for combustion with compressed air and fuel to produce a first compressed preburned flue gas,
said first compressed preburned flue gas being fed to a first heat exchanger for cooling, transferring heat to a cold compressed $CO_2$ lean flue gas produced downstream, forming a first compressed preburned cooled flue gas,
said first compressed preburned cooled flue gas sent to a hot potassium process $CO_2$ absorber plant for returning said cold compressed $CO_2$ lean flue gas back to said first heat exchanger for being heated to a first hot compressed $CO_2$ lean flue gas for feeding to said second burner, said first hot compressed $CO_2$ lean flue gas being mixed and afterburned by said second burner with a compressed air flow and at least a non-carbon fuel so as for increasing a temperature of said first hot compressed $CO_2$ lean flue gas to a second hotter compressed $CO_2$ lean flue gas for being fed into said first expander.

2. The carbon capture system of claim 1, wherein said second combustion chamber forms part of said coaxial pipe feeding the first expander, said coaxial pipe running from said first heat exchanger to said second combustion chamber, said coaxial pipe having said piping shell.

3. The carbon capture system of claim 2, wherein said coaxial piping shell is connected to a heat exchanger shell of said first heat exchanger, said heat exchanger shell being further connected to a first combustion chamber shell of said first combustion chamber, said first combustion chamber shell being arranged for feeding said compressed flue gas to said first combustion chamber.

4. The carbon capture system of claim 1, wherein said cold compressed $CO_2$ lean flue gas flow is split and one part is routed to said second burner as a temperature barrier.

5. The carbon capture system of claim 1, wherein said cold compressed $CO_2$ lean flue gas flow is split and one part is routed to said first gas turbine expander as cooling agent.

6. The carbon capture system of claim 1, wherein said second hotter compressed $CO_2$ lean flue gas being fed into said first expander for driving a shaft coupled to said generator and for generating a first expanded relative hot $CO_2$ lean flue gas further connected to a first heat recovery and steam generator unit.

7. The carbon capture system of claim 6, wherein said first heat recovery and steam generator unit is for production of a first steam further connected to heat exchange unit in a stripping unit included in said hot potassium process $CO_2$ absorber unit.

8. The carbon capture system of claim 6, wherein said first heat recovery and steam generator unit is for production of a second steam further connected to a steam generator for production of electrical power.

9. The carbon capture system of claim 1, wherein said first turbine expander is constructed to expand additional mass flow from said second burner.

10. The carbon capture system of claim 1, wherein said second hotter compressed $CO_2$ lean flue gas is being fed into said first expander and a second turbine expander in parallel with said first expander.

11. The carbon capture system of claim 10, wherein said cold compressed $CO_2$ lean flue gas flow is partly divided and routed to said first gas turbine expander and to said second turbine expander as cooling agent.

12. The carbon capture system of claim 1, wherein said first compressed preburned cooled flue gas is led to a second heat recovery unit and steam generator, and further cooling the said first compressed preburned cooled flue gas to a second compressed preburned cooled flue gas which is further led to said Hot Potassium Carbonate $CO_2$ absorber unit.

13. The carbon capture system of claim 1, wherein extracted $CO_2$ by said Hot Potassium Carbonate $CO_2$ absorber unit is led to a $CO_2$ compressor and then cooled down before utilized in an enhanced oil recovery sequestration.

* * * * *